United States Patent [19]
Rutledge

[11] Patent Number: 5,036,496
[45] Date of Patent: Jul. 30, 1991

[54] METHOD FOR CEMENT EVALUATION USING ACOUSTICAL LOGS

[75] Inventor: John M. Rutledge, Jersey Village, Tex.

[73] Assignee: Chevron Research and Technology Company, San Francisco, Calif.

[21] Appl. No.: 600,373

[22] Filed: Oct. 18, 1990

[51] Int. Cl.$^5$ ............................................. G01V 1/40
[52] U.S. Cl. ...................................... 367/35; 181/105
[58] Field of Search .................. 73/151, 152; 364/422; 181/105; 367/35, 25

[56] References Cited

U.S. PATENT DOCUMENTS

| | | | |
|---|---|---|---|
| 3,401,773 | 9/1986 | Synnott, III | 367/35 |
| 4,703,427 | 10/1987 | Catala et al. | 364/422 |
| 4,757,479 | 7/1988 | Masson et al. | 367/35 |
| 4,893,285 | 1/1990 | Masson et al. | 367/35 |
| 4,896,303 | 1/1990 | Leslie et al. | 367/35 |
| 4,928,269 | 5/1990 | Kimball et al. | 181/105 |

Primary Examiner—Ian J. Lobo
Attorney, Agent, or Firm—Edward J. Keeling; Matt W. Carson

[57] ABSTRACT

An improved method to determine the quality of a material disposed in an annular space behind a casing (or a liner) in a wellbore. A transit time of a sound wave to travel through a specimen of the material is determined, and a pulse velocity is calculated. The slurry density and mixing rate of the material are determined at a wellsite, and the slurry volume can then be calculated by multiplying the amount of time that the slurry remains at the slurry density by the mixing rate. The slurry has a theoretical acoustical impedance that is equal to the slurry density multiplied by the pulse velocity. The true annular displacement volume and a theoretical acoustical impedance map, an attenuation rate map, and a voltage map are than drawn. After running an acoustical log, a calculated acoustical impedance is derived, and is compared to the theoretical acoustical impedance to detertmine the quality of the material.

6 Claims, 1 Drawing Sheet

MODIFIED CBL CHART

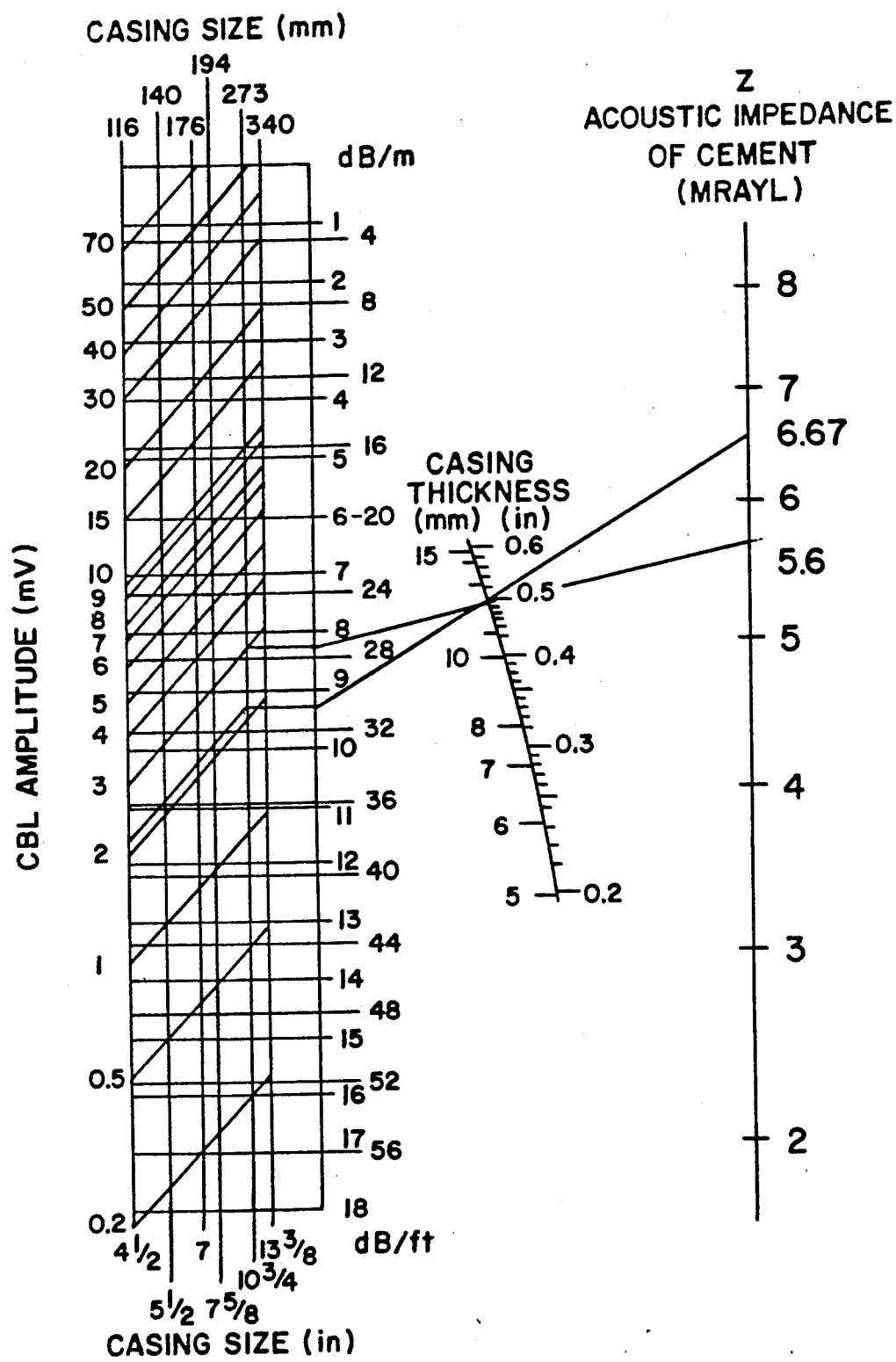
MODIFIED CBL CHART
FIG_1

METHOD FOR CEMENT EVALUATION USING ACOUSTICAL LOGS

FIELD OF THE INVENTION

This invention relates to the field of cement bond logging. More specifically, the invention is directed to a method for evaluating the quality of cement located outside a wellbore casing, using a new technique to interpret acoustical log data.

BACKGROUND OF THE INVENTION

In a well completion, a string of casing liner, or pipe is set in a borehole and a material such as cement is forced into the annulus between the casing and the borehole primarily to separate oil and gas producing formations from each other and from water bearing strata. Obviously, if the cementing fails to provide a separation of one zone from another, then fluids under pressure from one zone may be able to migrate and contaminate an otherwise productive nearby zone. Migration of water, in particular, produces undesirable water cutting of a producing zone and possibly can make a well non-commercial.

It is a problem to obtain an accurate picture of conditions behind a casing because of the difficulty of propagating signals through the casing wall. Various prior proposals to determine the separation effectiveness, (i.e., the blocking or sealing characteristics) of the cement behind the casing have not been entirely successful in clearly determining the effective presence of cement in the annulus between the casing and the formation. Further, it has not been possible to measure reliably the quality of the cement bond between the casing and the cement.

The mere presence or absence of cement in the annulus between the casing and formation is valuable information, however, this does not provide a complete picture of the cement conditions. While cement may be present in the annulus, channels or inadequate sealing may still permit fluid communication between adjacent formations.

Several prior developments for obtaining a measure of the quality of a cement bond relative to the casing have been disclosed in U.S. Pat. Nos. 3,291,274, 3,291,248 and 3,292,246. These systems generally utilize acoustical principles where an acoustical signal is transmitted between a transmitter and a receiver. The amplitude of the early arrival signal (this early arrival usually is the casing signal since the acoustical energy under average conditions generally travels faster in the casing than in the surrounding cement or formation) at the receiver is measured as a determination of the quality of the bond of cement to the casing. If a good bond existed, the casing signal would be expected to be attenuated because of the energy dissipated from the casing to the cement and surrounding formations, whereas if no bond or a poor bond existed the casing signal would be relatively unattenuated.

An additional technique for determining the quality of cement in the annulus between the casing and the formations is disclosed in U.S. Pat. No. 3,401,773. In this technique the amplitude of a reverberated early (casing) signal arrival is recorded and additionally, the total energy of a selected later portion of the sonic signal is obtained by integration to provide a second indication of the quality of the cement bond. Even in the absence of a weak casing arrival, the additional step of observing the total energy obtained by integrating a later portion of the signal in this manner can confirm the presence of cement in the casing-annulus-formation system.

It has been established that the energy content of the acoustical logging signals arriving at the receiver depends on other factors than the quality of the cement bond to the casing or the integrity of the cement column (sometimes called cement quality). The following factors were found to have substantial effect on signal arrivals, receiver sensitivity; the formation hardness; eccentering of the acoustical logging tool; the high temperature environment and the temperature variations in the well bore; type of casing; and the diameter of the borehole and casing as well as their shape or geometry.

A particular important shortcoming of previous cement evaluation logging systems which measure and rely only on the attenuation rate measurement is that this measurement is strongly affected by the microannulus which often appears between casing and the solid cement column after the cement has set up or solidified. These microseparations may occur either within the cement sheath itself, or at the interfaces of the cement column with the steel casing or formation. They may result from several factors including expansion and/or contraction of the casing due to either temperature or pressure cycles or borehole fluid changes or shock and vibration occurring during the well completion process or to shrinkage of the cement itself. Often these microseparations are small enough that the permeability of the annulus is not significantly modified, and the hydraulic seal offered by the cement column not impaired Microannuli do, however, severely reduce the acoustical attenuation rate measured by tools which determine the attenuation rate, and they cause the received amplitude to increase for tools which measure the peak amplitude only. Those measurements are thus not reliable measurements for use in estimating the hydraulic seal.

Currently the way in which cement evaluation is conducted is by the placing of some type of sonde tool inside the casing. This tool is passed through the casing from the bottom of well across the zone of interest. A sound wave passes through the casing, cement and formation and returns to a receiver. The quality of the cement job is then judged by examining the amplitude curve on the cement evaluation tool. This amplitude curve is read in millivolts with a dual scale normally being used of 0-20 mV and 0-100 mV. The voltage determined by the tool is a representation of attenuation rate, normally measured in decibels/ft. This attenuation rate is what is measured by the tool and the voltage is an electronic representation of it. The interpretation of this log is normally then done in the following method: the compressive strength of the cement slurry is determined experimentally, historically or a given value is used. This compressive strength is then converted into attenuation rate by use of a nomograph where a straight line is drawn from the compressive strength of the cement through the thickness of the casing to determine the attenuation rate. The attenuation rate is then converted into a voltage and this voltage is then considered to be a 100% bonded section. This method has been found to be most inadequate because data has been shown that proves no relationship exist between compressive strength and attenuation rate. (Jutten, J. J., Guilot, D., and Parceveaux, P. A., Society of Petroleum Engineers, Paper No. 16652-Revised).

U.S. Pat. No. 4,896,303 recognized the need to determine the acoustical impedance of the material believe well casing However, it only teaches a new apparatus and method which requires deriving a compensated attenuation rate signal which is representative of the attenuation of the received acoustical signal and a coupling signal representative of the attenuation of the received acoustical signal. As only a measurement of acoustical coupling is determined, only a relative measure of compressure strength can be generated. No new method of interpreting the acoustical data or deriving the attenuation rate is provided.

U.S. Pat. Nos. 4,893,285, and 4,757,479 issued to Masson et al. teach a method of measuring cement quality, whereby a Sonde transmits acoustical energy which excites the casing, annulus, and formation, and the ratio of the signals received by two longitudinally spaced receivers is examined. Peak amplitude of a portion of the acoustical casing signals are measured, and ratios of these peaks are studied to determine cement quality. No new method of interpreting the acoustical, data is provided.

U.S. Pat. No. 4,703,427 issued to Catala et al. teaches a method of obtaining ultrasonic pulse signals recorded by a cement evaluation tool and dividing the signals into time windows After normalization of the signal magnitudes, cement quality is determined by comparing the magnitudes with the measured acoustical impedances of various media. None of the prior work describes a method of using cement slurry density volume to generate an acoustical impedance map to compare, along with an attenuation rate map, to a voltage map to compare the theoretical value of acoustical impedance to a calculated acoustical impedance, to predict the quality of a material, such as cement, disposed behind the casing in a wellbore. There is therefore a need for such a method to provide an inexpensive, quick, and accurate determination of cement quality.

SUMMARY OF THE INVENTION

The present invention is surprisingly successful in determining the quality of a material such as cement, disposed in the annular space behind the casing and/or liner in a wellbore.

A sonic test cell is used to determine the transit time of a sound wave to travel through a specimen of the material, at temperature and pressure curing conditions. A pulse velocity is then determined by dividing the length of the specimen by the travel time. Slurry density and mixing rate of the material can be determined at the wellsite. A recording density device is especially useful to determine slurry density.

Slurry volume is then determined, by multiplying the amount of time that the slurry remains at the slurry density by the mixing rate. True annular displacement volume is then determined, and a theoretical acoustical impedance map of the annular space can be generated. Theoretical acoustical impedance is equal to the slurry density multiplied by the pulse velocity.

Casing thickness is then compared to the theoretical acoustical impedance to generate an attenuation rate map and a voltage map. After an acoustical log is run, a calculated acoustical impedance is determined, and the calculated acoustical impedance is then compared to the theoretical acoustical impedance, to predict the quality of the material. The method may contain the additional steps of running a three dimensional casing centralization program in conjunction with a drilling database having accurate survey points to aid in the centralization of the casing and/or liner within the wellbore.

The determination of theoretical acoustical impedance may further comprise contaminating the slurry with various concentrations of drilling fluid and determining the transit time in a sonic test cell, under downhole temperature and pressure conditions. The sonic test cell may also be used to predict the optimum time to run the acoustical log, which is when there is little or no more charge in the pulse velocity of the material.

The above and other objects, advantages, and features of the method of the invention will become more readily apparent from the following detailed description of the invention, which is provided in connection with the accompanying drawings.

DESCRIPTION OF THE DRAWINGS

FIG. 1 is a modified cement bond log interpretation nomograph which is used to determine attenuation rate, voltage, and calculated acoustical impedance.

DETAILED DESCRIPTION OF THE INVENTION

In accordance with the present invention, a new improved method for evaluating the quality of a material located in the annular space behind a casing and/or liner in a wellbore, such as cement, has been developed.

A new relationship has been developed, which has been shown to relate acoustical impedance with acoustical attenuation rate. Acoustical impedance may be expressed as:

$$Z = pv$$

where
 $Z$ = acoustical impedance (Mrayl)($10^6$ kg/$m^2$sec)
 $p$ = density (kg/$m^3$)
 $v$ = pulse velocity (m/sec)

Attenuation rate can be determined from an acoustical impedance by the use of a nomograph, as well as by reading the voltage displayed on a sonic amplitude curve, as done in the prior art.

Applicant's new procedure determines a theoretical, accurate acoustical impedance, which is compared to acoustical impedance which is calculated at the wellbore. This relationship of theoretical to calculated acoustical impedance can then be used to indicate the quality of the material behind the casing and/or liner.

In the preferred embodiment, the material located in the annular space behind the casing is cement. To determine cement quality, a sonic test cell is used to determine the transit time (sec) of a sound wave to travel through a specimen of the cement that is to be studied. The specimen is measured to have a certain length (m), and is subjected to temperature and pressure curving conditions which exist at the selected depth of the wellbore. The transit time is measured continuously through a time frame.

A pulse velocity (m/sec) of the cement specimen is then determined by dividing the length of the specimen by the transit time.

The slurry density of the cement (Kg/$m^3$) is then determined. This can be accomplished at the wellsite by the use of a continuous recording density device known in the art, such as a radioactive densiometer or a pneumatic densiometer.

The mixing (pump) rate (m/sec) of the cement must also be recorded at the wellsite. The volume of the slurry (m³) can then be determined by multiplying the amount of time (sec) that the slurry remains at the recorded slurry density by the mixing rate. The theoretical acoustical impedance of this slurry is also known, as it equals slurry density multiplied by the pulse velocity.

The precise location of this volume of cement having a known, theoretical acoustical impedance, within the annular space behind the casing (or liner) can then be determined by calculating the true annular displacement volume (m³). The true annular displacement volume can either be calculated or measured by either a mechanical or a fluid caliper known in the art. A mechanical caliper is a tool that is run into the wellbore, having arms that extend outward to contact the wellbore A fluid caliper is run by pumping a pill into the well and then recording the time that is required for the pill to flow through the casing and/or liner, to reach the bottom of the well, and then to come back up the hole, on the outside of the casing, to the surface. As the pill is pumped at a known rate, and a known time is measured, the volume of the wellbore can be determined. The volume inside the casing (known) is subtracted, and the remaining volume constitutes the annular space.

Once the true annular displacement volume is known, a theoretical acoustical impedance map of the annular space can then be calculated or determined. As the casing or liner thickness at various locations within the well is known, an attenuation rate map can then be determined, by comparing casing thickness to the theoretical acoustical impedance, at various locations in the wellbore, by using a nomograph.

A voltage map can then be determined through the use of a nomograph, by comparing the attenuation rate to the casing diameter. The voltage map provides the voltages that would be recorded if the annular space were 100% filled with cement.

An acoustical logging tool must be run in the wellbore across the zones of interest. After the voltages (mV) are recorded, a calculated acoustical impedance is then determined, using a nomograph, by comparing the recorded voltage to the acoustical impedance map, the casing thickness, and the attenuation rate map. The calculated acoustical impedance can then be compared to the theoretical acoustical impedance, to predict the quality of the cement, or other material that is disposed in the annular space outside of the casing and/or liner. The inventive procedure can be greatly simplified by the use of computer programs to calculate slurry volumes, place the slurry within the annular space, calculate acoustical impedance, attenuation rate, and voltage, and draw appropriate maps or compare calculated values to log values.

In another embodiment of the invention, certain quality assurance steps are taken to assure a valid acoustical log run. A three dimensional casing centralization program (known in the art) should be run in conjunction with a drilling database having numerous accurate survey data points. These steps aid in the centralization of the casing in the wellbore. As the well is drilled, a survey is run that provides directional and hole angle information. A centralizer is then run to predict the cement sheath thickness.

In another embodiment of the invention, the determination of theoretical acoustical impedance further comprises contaminating the cement slurry with various concentrations of drilling mud. The transit time of the contaminated slurry, under downhole temperature and pressure conditions is then determined, in the sonic test cell.

In yet another embodiment of the invention, the sonic test cell is also used to predict the optimum time at which to run an acoustical log (such as a cement evaluation log). The optimum time is that time after which little or no change in the pulse velocity will occur.

The prior art is primarily concerned with determining compressive strength. A tool measures acoustical impedance, but acoustical impedance is never displayed or compared. Only a cement map and a compressive strength presentation is provided.

The inventive method, on the other hand calculates a theoretical acoustical impedance prior to running the acoustical log. This value is then compared with the measured acoustical impedance, to develop a measure of cement quality.

As an example, consider a cement job in a wellbore, when the cement has been mixed according to the following specifications. A lead cement is first pumped into the wellbore, followed by the tail cement.

| Volume | Slurry density |
|---|---|
| Lead Cement | |
| 8 m³ @ | 1425 kg/m³ (11.9 ppg) |
| 4 m³ @ | 1461 kg/m³ (12.2 ppg) |
| 2 m³ @ | 1510 kg/m³ (12.6 ppg) |
| Tail Cement | |
| 2 m³ @ | 1845 kg/m³ (15.4 ppg) |
| 4 m³ @ | 1917 kg/m³ (16.0 ppg) |
| 2 m³ @ | 1964 kg/m³ (16.4 ppg) |

A sonic test cell has been used to measure the transit time through the cement, and pulse velocities have been determined, by dividing the length of the specimen by the transit time. The pulse velocity of all the volumes of the lead cement is found to be constant at 1900 m/sec. The pulse velocity of all the volumes of the tail cement is found to be constant at 3400 m/sec. The theoretical acoustical impedance is known, as it equals the slurry density multiplied by the pulse velocity.

| Slurry Density | Pulse Velocity | Theoretical Acoustical Impedance |
|---|---|---|
| Lead Cement | | |
| 1425 kg/m³ × | 1900 m/sec = | 2.71 Mrayl |
| 1461 kg/m³ × | 1900 m/sec = | 2.78 Mrayl |
| 1510 kg/m³ × | 1900 m/sec = | 2.87 Mrayl |
| Tail Cement | | |
| 1845 kg/m³ × | 3400 m/sec = | 6.27 Mrayl |
| 1917 kg/m³ × | 3400 m/sec = | 6.52 Mrayl |
| 1964 kg/m³ × | 3400 m/sec = | 6.67 Mrayl |

The true annular displacement volume can then be calculated, to determine the precise location of the volumes of cement within the annular space behind the casing, by using a mechanical or a fluid caliper. In this example, a true annular displacement volume has been determined so that 1 cubic meter (1 m³) of cement occupies 100 feet of annular space. A theoretical acoustical impedance map can now be drawn as follows, from bottom to top:

| Ht. of Cement | Slurry Density | Theoretical Acoustical Impedance |
|---|---|---|
| Bottom | | |
| 800 ft. @ | 1425 Kg/m³ | 2.71 Mrayl |
| 400 ft. @ | 1461 Kg/m³ | 2.78 Mrayl |
| 200 ft. @ | 1510 Kg/m³ | 2.87 Mrayl |
| 200 ft. @ | 1845 Kg/m³ | 6.27 Mrayl |
| 400 ft. @ | 1917 Kg/m³ | 6.52 Mrayl |
| Top | | |
| 200 ft. @ | 1964 Kg/m³ | 6.67 Mrayl |

The example well has a casing design, which is as follows from bottom to top:

| Length | OD | Grade | Weight | ID | Casing Thickness |
|---|---|---|---|---|---|
| 600' | 10¾ | C95 | 55# | 9.76 | .495 |
| 800' | 10¾ | J55 | 51# | 9.85 | .45 |
| 800' | 10¾ | H40 | 40.5 | 10.05 | .35 |

An attenuation rate may for 100% bonded samples can then be determined, by comparing casing thickness to the theoretical acoustical impedance, at various locations in the wellbore, by using a nomograph. FIG. 1 is an example of a suitable nomograph. In this example, the theoretical acoustical impedance of the top sample is 6.67 Mrayl. A line is drawn from the acoustical impedance value through the casing thickness valve of 0.45 inches, to intersect the attenuation rate chart at approximately 9.3 dB/m. The following attenuation rate map can now be completed, to plot attenuation rate against cement density.

| Tail Cement Density | 100% Bonded Attenuation Rate dB/st |
|---|---|
| 1964 | 9.3 |
| 1917 | 9.1 |
| 1845 | 9.6 |

| Lead Cement Density | 100% Attenuation Rate dB/st |
|---|---|
| 1425 | 4.8 |
| 1461 | 4.0 |
| 1510 | 4.4 |

A voltage map may now be determined, using the same nomograph as in FIG. 1 In this example, the attenuation rate was determined to be 9.3 dB/m. As casing size (diameter) is 10-¾ inches, a line is drawn from 9.3, straight across the chart to intersect with the vertical line representing 10-¾ inches. To determine the voltage, if the annular space were 100% bonded, the line must now be drawn down the voltage lines parallel to the lines which connect the CBL Amplitude (mV) column to the casing size columns. In this example, a voltage of 2.2 mV is calculated. Now, a voltage map can be constructed, as follows:

| Ht. of Cement | Slurry Density | Voltage |
|---|---|---|
| Bottom | | |
| 800 ft. @ | 1425 kg/m³ @ | 10 mV |
| 400 ft. @ | 1461 kg/m³ @ | 15 mV |
| 200 ft. @ | 1510 kg/m³ @ | 13 mV |
| 200 ft. @ | 1845 kg/m³ @ | 2.0 mV |
| 400 ft. @ | 1917 kg/m³ @ | 2.4 mV |
| Top | | |
| 200 ft. @ | 1964 kg/m³ @ | 2.2 mV |

An acoustical logging tool, such as Schlumberger's Cement Bond Log is then run in the wellbore, across the zones of interest. Voltages are recorded, and a calculated acoustical impedance is then determined, by using the nomograph in FIG. 1. In this example, 3 mV were recorded. By following the voltage line to the casing size (10-¾ inches), then traversing horizontally to the attenuation rate vertical line, then intersecting with the proper casing thickness of 0.5 inches and projecting to the acoustical impedance line, a calculated acoustical impedance of 5.6 Mrayl is determined.

This calculated value of 5.6 Mrayl can then be compared to the theoretical acoustical impedance of 6.67 Mrayl, to predict the quality of the cement. The relationship is empirical, and various sections can be compared to determine a cement quality index, which is defined as:

$$CQI = C/T$$

where
 CQI = cement quality index
 C = calculated acoustical impedance
 T = theoretical acoustical impedance
For this example, CQI = 5.6/6.67 = 84%

While a preferred embodiment of the invention has been described and illustrated, it should be apparent that many modifications can be made thereto without departing from the spirit or scope of the invention. Accordingly, the invention is not limited by the foregoing description, but is only limited by the scope of the claims appended hereto.

What is claimed is:

1. A method of determining the quality of a material disposed in an annular space behind a casing and/or liner in a wellbore, comprising:
 (a) using a sonic test cell to determine a transit time of a sound wave to travel through a specimen of said material, said specimen having a certain length, at temperature and pressure curing conditions which exist at said wellbore;
 (b) determining a pulse velocity by dividing said length of said specimen by said transit time;
 (c) determining a slurry density of said material;
 (d) recording a mixing rate at said wellbore;
 (e) determining a volume of said slurry by multiplying the amount of time that said slurry remains at said slurry density by said mixing rate, said slurry volume having a theoretical acoustical impedance that is equal to said slurry density multiplied by said pulse velocity;
 (f) determining a true annular displacement volume in said wellbore;
 (g) determining a theoretical acoustical impedance map of said annular space behind said casing;
 (h) comparing a known casing and/or liner thickness at various locations within said wellbore to said theoretical acoustical impedance, to determine an attenuation rate map at said various locations;
 (i) determining a voltage map, by comparing said attenuation rate to the casing diameter;

(j) running an acoustical log across said locations within said wellbore;

(k) comparing said theoretical acoustical impedance map, said casing and/or liner thickness and said attenuation rate map to said voltage map to determine a calculated acoustical impedance of said material disposed behind said casing and/or liner; and (l) comparing said calculated acoustical impedance with said theoretical acoustical impedance, to predict said quality of said material.

2. The method of claim 1 wherein said slurry density is determined at said wellsite by using a continuous recording density device.

3. The method of claim 1 wherein said true annular displacement volume can be measured by using a mechanical or fluid caliper.

4. The method of claim 1 further comprising the steps of running a three dimensional casing centralization program in conjunction with a drilling data base having numerous accurate survey data points, to aid in the centralization of said casing and/or liner within said wellbore.

5. The method of claim 1 wherein said theoretical acoustical impedance determination further comprises;

(a) contaminating said slurry with various concentrations of drilling mud; and determining the transit time of said contaminated slurry under downhole temperature and pressure conditions, in said sonic test cell.

6. The method of claim 1 wherein said sonic test cell is also used to predict the optimum time to run said acoustical log, said optimum time being that time after which little or no change in said pulse velocity will occur.

* * * * *